(12) United States Patent
Faivre et al.

(10) Patent No.: US 11,379,050 B2
(45) Date of Patent: Jul. 5, 2022

(54) PERIPHERAL HAVING AT LEAST ONE TRANSPARENT KEY COMPRISING A FLEXIBLE MEMBRANE

(71) Applicant: GROUPE LDLC, Limonest (FR)

(72) Inventors: Laurent Faivre, Ecully (FR); Yuria Puggioni, Lyons (FR)

(73) Assignee: GROUPE LDLC, Limonest (FR)

( * ) Notice: Subject to any disclaimer, the term of this patent is extended or adjusted under 35 U.S.C. 154(b) by 0 days.

(21) Appl. No.: 16/962,396

(22) PCT Filed: Jan. 16, 2019

(86) PCT No.: PCT/FR2019/050092
§ 371 (c)(1),
(2) Date: Jul. 15, 2020

(87) PCT Pub. No.: WO2019/141944
PCT Pub. Date: Jul. 25, 2019

(65) Prior Publication Data
US 2021/0089135 A1 Mar. 25, 2021

(30) Foreign Application Priority Data
Jan. 16, 2018 (FR) ...................................... 18 50360

(51) Int. Cl.
*H01H 13/70* (2006.01)
*G06F 3/02* (2006.01)
*G06F 3/01* (2006.01)

(52) U.S. Cl.
CPC ............ *G06F 3/0202* (2013.01); *G06F 3/016* (2013.01)

(58) Field of Classification Search
None
See application file for complete search history.

(56) References Cited

U.S. PATENT DOCUMENTS

| | | | |
|---|---|---|---|
| 2003/0020999 A1* | 1/2003 | Tsujimura | G06F 1/169 359/245 |
| 2006/0060463 A1 | 3/2006 | Tokusashi | |
| 2010/0213043 A1* | 8/2010 | Chen | H01H 13/83 200/5 A |
| 2012/0160653 A1 | 6/2012 | Chao | |
| 2013/0082932 A1 | 4/2013 | Glueckstad et al. | |
| 2014/0262716 A1* | 9/2014 | Weber | H01H 13/85 200/344 |

FOREIGN PATENT DOCUMENTS

WO 2016/142881 9/2016

* cited by examiner

*Primary Examiner* — Carl Adams
(74) *Attorney, Agent, or Firm* — Clark & Brody LP

(57) ABSTRACT

The invention relates to a peripheral (1) including at least one transparent key (2), actuable under the effect of pressure and engaged in an opening (11) arranged on a first face (10a) of a case (10), the peripheral (1) including a system (13) for controlling and detecting a pressure exerted on the key (2), and at least one screen (4) allowing symbols (3) to be displayed through each key (2) via respectively a display path (5), the control and detection system (13) including a flexible membrane (14) ensuring an actuating force and a pressure feedback effect and including at least one orifice (17), each orifice delimiting a display path (5) for a key (2), and each orifice (17) being delimited by a border (17a) cooperating with a key (2).

18 Claims, 5 Drawing Sheets

PERIPHERAL HAVING AT LEAST ONE TRANSPARENT KEY COMPRISING A FLEXIBLE MEMBRANE

The present invention relates to peripherals including at least one transparent key, actuable under the effect of pressure, provided with a system allowing an actuating force and a pressure feedback effect after a pressure exerted on the key.

Conventionally, peripherals including transparent keys comprise a case provided on its front, with openings in which the keys are engaged, and at least one screen on which the symbols or the images to be viewed through the transparent keys are displayed. These peripherals also comprise a system allowing the detection of a pressure exerted on a key. These peripherals also comprise a haptic system allowing the user to feel when the key is effectively pressed (actuating force), as well as a system for a pressure feedback effect after a pressure exerted on the key.

Different control systems, i.e. haptic systems and for a pressure feedback effect, are known. For example, application WO 2016/142881 describes a device for a computer, such as a computer keyboard, including a case provided on its front, with openings in which keys at least partially transparent are engaged, through which symbols displayed on a screen can be viewed. The device also includes a system for detecting a pressure exerted on the key and a system ensuring an actuating force, in the shape of a dome which is crushed when a pressure is exerted on the key, and a pressure feedback effect system, in the shape of scissors, hinge or spring.

A first disadvantage associated with a system with a mechanical pressure feedback effect is the deterioration of this system over time. Indeed, these pressure feedback effect systems wear out over time.

A second disadvantage associated with a mechanical pressure feedback effect system is the haptic effect which is not sufficiently pleasant and which is deteriorated over time.

In addition, in document WO 2016/142881, the key mechanism cooperates with the latter over a large surface and is visible through the transparent key. As a result, there is a risk of poor display of the screen through the transparent key.

Another problem relates to the displacement travel of the key resulting from a pressure exerted thereon, which must be stable and balanced. According to a particular embodiment, the document WO 2016/142881 describes lugs located on the periphery of the key, capable of cooperating in complementary housings located on the inner face of the case, so as to allow the key to be positioned when no pressure is exerted thereon. In addition, the stability of the key during its displacement travel is not guaranteed.

Another example of a haptic and pressure feedback system is described in application U.S. 2013/0082932. This application describes a dynamic display keyboard comprising a plurality of at least partially transparent keys, a mat, an optical element for each key and at least one screen. The mat is flexible and may include a plurality of protruding elements, such as domes with a trapezoidal profile, capable of ensuring an actuating force and a pressure feedback effect for the key located above, by undergoing a deformation. The mat further comprises attachment elements that can be attached to the keys, and allowing to detect a pressure exerted on a key when they come into contact with a capacitive screen. The mat includes orifices to allow light to pass from the screen located below to the transparent portion of the key located above.

A disadvantage associated with this system is that the key is insufficiently maintained during its displacement travel following the application of a pressure. Indeed, such a floating mounting causes uncertainty about the position of the key.

Another example is illustrated in application U.S. 2012/0160653, which describes a keyboard including keys made of a material which is transparent or transmitting light. The keyboard also includes a layer located below the keys and on which is printed a pattern that includes opaque sections and light-transmitting sections. Thus, thanks to the presence of a light source, the pattern of the layer is visible through the key below which it is located. The key is also disposed above an elastic part located above a switch. When a pressure is exerted on the key, the elastic part deforms, allowing the switch to be actuated.

A disadvantage associated with this system is the holding in position of the key as well as its guidance when a pressure is exerted thereon. Indeed, it is essential to hold the key in position and guide it during its displacement travel to avoid any uncertainty in its positioning and good translation relative to the case when a pressure is exerted.

The present invention aims at overcoming the disadvantages of the prior art. For this purpose, a first object of the invention is to propose a peripheral comprising a system with a pressure feedback effect ensuring good haptic properties and which does not wear out over time, and particularly less than a mechanical pressure feedback effect system. Advantageously, the pressure feedback system allows good viewing of the screen through the transparent key.

An object of the invention is to provide a peripheral comprising a key whose positioning is precise, while being guided during its displacement.

Another object of the invention is to propose a peripheral comprising a key, the guiding of which is ensured over its entire displacement travel resulting from a pressure exerted thereon. More specifically, the displacement travel of the key is stable and balanced.

For this purpose, the peripheral according to the invention is such that it includes at least one transparent key, actuable under the effect of pressure and engaged in an opening arranged on a first face of a case, the peripheral including a system for controlling and detecting a pressure exerted on the key, and at least one screen allowing symbols to be displayed through each key via respectively a display path, the control and detection system including a flexible membrane ensuring an actuating force and a pressure feedback effect and including at least one orifice, each orifice delimiting a display path for a key, and each orifice being delimited by a border cooperating with a key.

In the context of the invention, "actuating force" means the force necessary for a pressure applied on a key to be detected.

The peripheral according to the invention advantageously has one or the other of the following characteristics, taken alone or in combination, when they are not mutually exclusive:
  the peripheral includes a series of keys;
  each key includes a lower peripheral region bearing on the border of an orifice of the flexible membrane;
  the flexible membrane includes a skirt extending from a base plate and delimiting at its free end the border of each orifice of the flexible membrane;
  the border of each orifice of the flexible membrane cooperates with the bottom of a groove arranged around the periphery of each key;

the control and detection system includes a device for detecting a pressure exerted on the separate key of the flexible membrane;

the detection device has a bearing surface for the flexible membrane;

the detection device includes one passage per display path;

the detection device includes a switching structure on which acts at least one tab secured to a key, so as to provide an actuating signal when a pressure is exerted on said key;

the flexible membrane includes a hole for the passage of each tab secured to a key;

the control and detection system is a flexible membrane incorporating a switching structure;

the peripheral comprises, for each key, at least one key guide structure;

the key cooperates with the first face of the case, preferably with two guides extending protruding from the inner surface of the first face of the case;

a guide structure is composed of a tab secured to a key and two guides extending protruding from the inner surface of the first face of the case, to delimit therebetween a slide for said tab, at a height allowing to guide said tab in the slide throughout the displacement travel resulting from a pressure exerted on said key;

the peripheral includes, for each key, four guide structures;

the key guide structures are aligned in pairs along two intersecting axes;

the screen is a bi-stable screen, preferably an electrophoretic screen; and the peripheral is an electronic control keyboard.

Another subject of the invention relates to an article comprising a peripheral according to the invention. For example, such an article can be a computer, a machine tool, a medical apparatus, a hi-fi apparatus, a dashboard, a personal digital assistant, a control panel or a remote control.

Various other characteristics will emerge from the description given below with reference to the appended drawings which show, by way of non-limiting examples, embodiments of the object of the invention.

Figure 1:
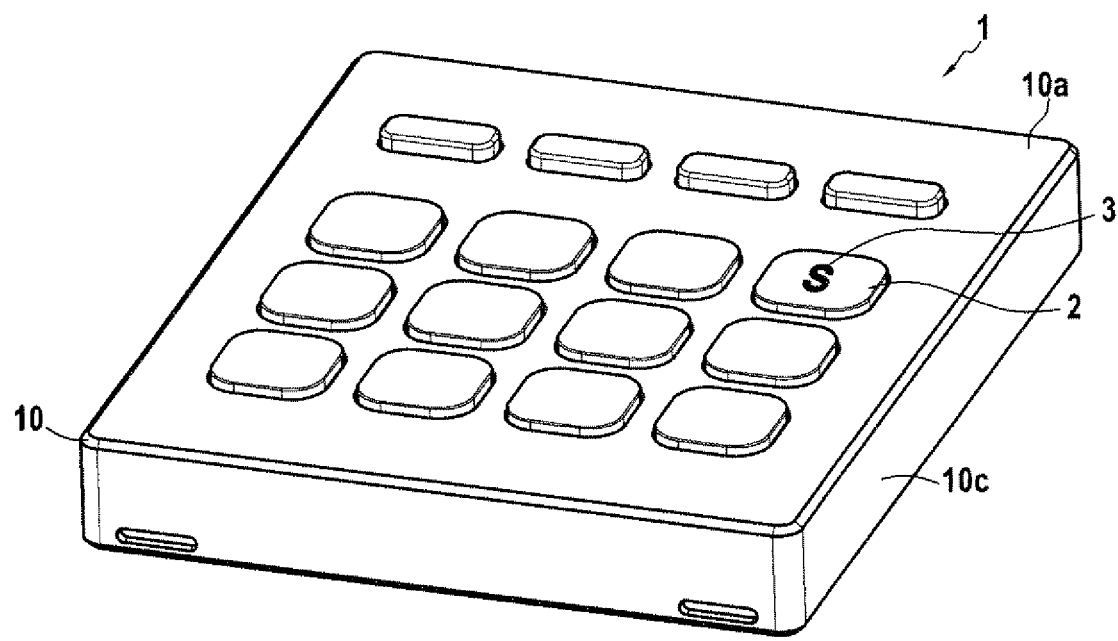
FIG. 1 is a perspective view of a peripheral in accordance with the invention.

The peripheral according to the invention can be an electronic control keyboard, such as a computer peripheral, a hi-fi peripheral, a peripheral of a machine tool, a peripheral of a dashboard, a personal digital assistant or of a control panel. According to a particular embodiment, the peripheral according to the invention is a computer peripheral, such as a computer keyboard or a mouse.

As can be seen from the figures, the object of the invention relates to a peripheral 1 including at least one transparent key 2 through which a symbol 3 displayed on a screen 4 is viewed via a display path 5. For the case where the peripheral includes several transparent keys 2, the peripheral 1 includes one display path per key 2. Advantageously, the peripheral 1 does not include an opaque key.

"Display path" means the path which allows the symbols or images displayed on the screen 4 to be viewed through the various constituent elements of the peripheral, including the transparent key 2.

Figure 3:
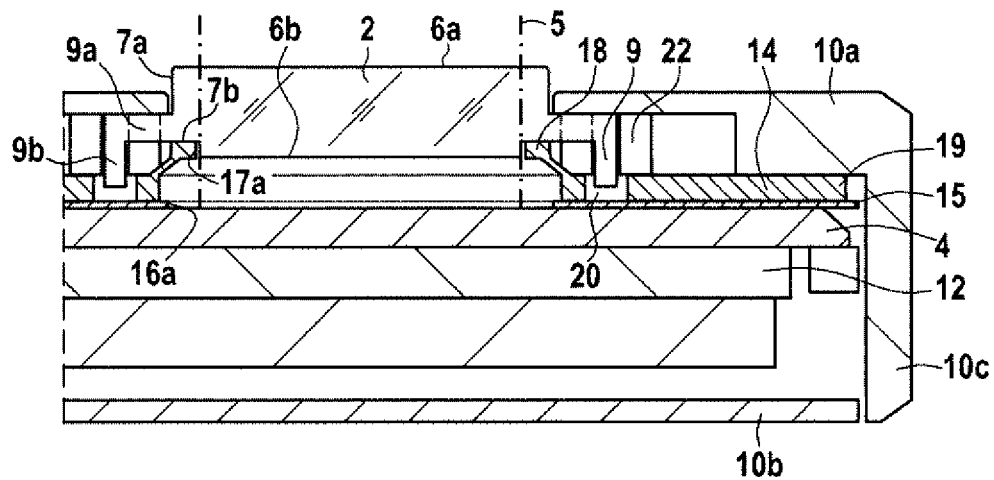
FIG. 3 is a sectional view of a portion of a peripheral in accordance with the invention.

In the context of the invention, a key can be a block having a section of any shape, and for example a circular or trapezoidal section, particularly a block whose section is a parallelogram, a rectangle or a square. Each key 2 includes an upper surface 6a on which a pressure can be exerted and a lower surface 6b extending substantially opposite the upper surface 6a, connected together by a peripheral region 7. According to one embodiment of the invention, each key 2 includes a lateral peripheral region 7a extending from the upper surface 6a and prolonging by a lower peripheral region 7b whose section is respectively substantially parallel to the upper 6a and lower 6b surfaces, as shown in FIG. 3. According to a particular embodiment, each key 2 includes a groove 8 arranged around the entire periphery of the peripheral region 7 and delimiting the lower peripheral region 7b.

According to an advantageous characteristic of the invention, each key 2 includes at least one tab 9 which, in the example illustrated, is made in a single piece with the key. Of course, the tab 9 can be added by being assembled to the key 2 by any suitable means. Each tab 9 extends protruding from said key 2, from its peripheral region 7. In other words, each tab 9 is arranged to be projecting relative to the upper surface 6a of the key 2. When the key is in the shape of a block of trapezoidal section, a tab 9 can extend protruding from the peripheral region 7, at an angle or on one side of the upper surface 6a of the key 2.

According to a preferred embodiment, the screen 4 allows a dynamic display of the symbols 3. In other words, the symbols 3 displayed for each key 2 can be modified following a command given by the user or by an application. The screen 4 can be an LCD (liquid crystal display), TFT-LCD (thin film transistor liquid crystal display), LED (light emitting diode), OLED (organic light emitting diode), AMOLED (active matrix OLED), IPS screen (in-plane switching), VA (vertical alignment), TN (twisted nematic), a cathode screen, a plasma screen or an electrophoretic screen. The screen 4 is preferably a bi-stable screen, and particularly an electrophoretic screen.

The peripheral 1 comprises a case 10 composed of a first face 10a provided with an opening 11 for each key 2 and of a second opposite face 10b. Thus, each key 2 rises on either side of the first face 10a of the case 10 which it crosses via an opening 11 when no pressure is exerted on the key 2, as shown in FIGS. 1 and 3. In the context of the invention, the first face 10a of the case 10 corresponds to the upper wall of the case 10 provided with an opening 11 for each key 2, and the second face 10b of the case 10 corresponds to the lower wall of the case 10.

Figure 2:
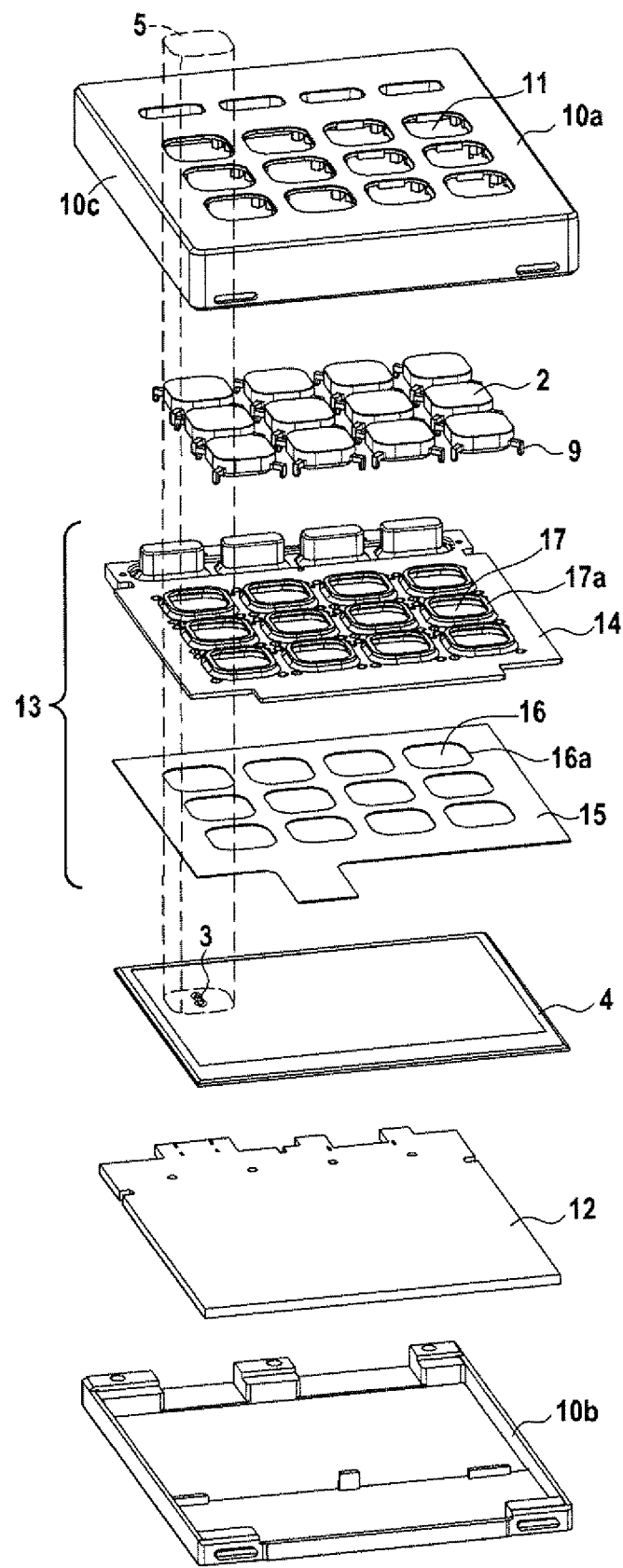
FIG. 2 is an exploded perspective view of a stack of the various elements constituting a peripheral in accordance with the invention.

According to the embodiment shown in FIG. 2, the peripheral 1 also comprises an electronic circuit 12 ensuring the functionalities of the peripheral 1, and in particular the transmission of the actuating signal.

The peripheral 1 also comprises a control and detection system 13 for controlling and detecting a pressure exerted on the key 2. The control and detection system 13 not only imparts the haptic properties to the key, and particularly an actuating force and a pressure feedback effect after a pressure exerted on the key 2, but also allows detecting a pressure exerted on this key.

In accordance with the invention, the control and detection system 13 includes a flexible membrane 14 ensuring an actuating force and a pressure feedback effect after a pressure exerted on a key 2. The flexible membrane 14 contributes in holding the key 2 in position, when no pressure is exerted on said key 2 and during its displacement travel resulting from an exerted pressure.

According to a first embodiment shown in FIGS. 2 and 3, the control and detection system 13 includes a flexible membrane 14, and a detection device 15 for detecting a pressure exerted on the key 2 separate from the flexible membrane 14. As shown in FIG. 3, the detection device 15 advantageously has a bearing surface for the flexible membrane 14.

According to another embodiment not shown in the figures, the control and detection system 13 can be a flexible membrane as described in the context of the invention and further integrating a switching structure allowing to provide an actuating signal when a pressure is exerted on a key 2. Such a flexible membrane with integrated switching structure then allows imparting the desired haptic properties thanks to the flexible nature and the geometry of the membrane, as well as detecting a pressure exerted on the key thanks to the integrated switching structure.

According to the embodiment illustrated in FIGS. 2 and 3, the peripheral according to the invention includes an electronic circuit 12, a screen 4, a detection device 15, a flexible membrane 14, at least one key 2 and a case 10. More specifically, the peripheral 1 can include the case 10 composed of a first face 10*a* provided with openings 11 through which keys 2 can pass, and a second face 10*b* capable of bearing on flanged edges 10*c* of the first face. The other elements constituting the peripheral 1 are placed inside the case 10 which is then locked in the closed position by any appropriate means.

As illustrated in FIGS. 1 to 3, the keys 2 are engaged through the openings 11 of the first face 10*a* of the case 10, so as to project from the first face 10*a* of the case 10. According to this embodiment, the flexible membrane 14 is placed below the keys 2. The flexible membrane 14 is placed above the detection device 15 which then has a bearing surface for the flexible membrane 14. The detection device 15 is in turn placed above the screen 4 on which the symbols 3 are displayed for each key 2. Finally, the electronic circuit 12 can be placed below the screen 4, and above the second face 10*b* of the case 10. In other words, the keys 2 can be positioned between the first face 10*a* of the case 10 (through the openings 11) and the flexible membrane 14, the detection device 15 being located between the flexible membrane 14 and the screen 4 which in turn is in contact with the electronic circuit 12. This arrangement is not critical, and another stacking can be carried out within the framework of the invention. For example, the screen 4 could be placed between the flexible membrane 14 and the detection device 15.

When the detection device 15 is positioned between the screen 4 and the transparent key 2, as illustrated in FIGS. 2 and 3, said detection device includes one passage 16 per display path 5. This passage 16 is of similar dimension, and has a surface at least as large as the opening 11 in which the adjacent key 2 is housed. The passage 16 of the detection device 15 and the opening 11 of the first face 10*a* of the case 10 are placed in the position of superposition or coincidence.

Thus, the detection device 15 is not visible through the transparent key 2, and the border 16*a* of a passage 16 delimits the display path 5.

The detection device 15 may include a touch structure or, preferably, a switching structure on which acts at least one tab 9 secured to a key 2, so as to provide an actuating signal when a pressure is exerted on the key 2, and for example so as to generate an electrical signal. For example, the switching structure can be composed of two insulating sheets covered on their inner face with a conductive surface, and separated by an insulating sheet including openings. Applying a pressure on the switching structure, at the location of an opening of the insulating sheet, allows the two conductive surfaces to come into contact. Such switching structures which may be suitable in the context of the invention are known to the person skilled in the art, and will not be detailed here.

Each tab 9 is positioned perpendicular to an opening in the insulating sheet and has a height suitable for acting on the detection device 15. In the example illustrated, each tab 9 has a connecting branch 9*a* extending substantially parallel to the upper surface 6*a* of the key 2 and being prolonged at a right angle, by an actuating branch 9*b* extending vertically. When a pressure is exerted on a key 2, the tab 9, by its actuating branch 9*b*, can come into contact with the detection device 15 which then provides an actuating signal.

According to the illustrated embodiment, the free end of the actuating branch 9*b* includes a stud, particularly of circular section. Such a stud allows concentrating the stresses on a smaller surface, and particularly facilitating the detection of a pressure exerted on the key 2.

Although not illustrated, the free end of the actuating branch can be devoid of any stud.

The flexible membrane 14 includes at least one orifice 17 in relation to each key 2, of substantially similar dimension and of surface substantially smaller than that of the opening 11 into which the key 2 is inserted. The orifice 17 and the opening 11 are preferably superimposed, the orifice 17 being below the opening 11. The orifice 17 and the opening 11 are concentric, the key 2 being positioned between the orifice 17 and the opening 11. Each orifice 17 includes a border 17*a* which delimits the display path 5 for each key 2. Thus, in the embodiment shown in FIGS. 2 and 3, the display path 5 for a transparent key 2 is delimited by the upper surface 6*a* of the key 2, the opening 11 of the first face 10*a* of the case 10, the border 17*a* of the orifice 17 of the flexible membrane 14 cooperating with the key 2, and the border 16*a* of the passage 16 of the detection device 15 located below. In other words, the upper surface 6*a* of each key 2 is superimposed with the orifice 17 of the flexible membrane 14 and with the passage 16 of the detection device 15.

Each orifice 17 of the flexible membrane 14 is delimited by a border 17*a* which cooperates with a key 2. More specifically, this border 17*a* can cooperate with the peripheral region 7 of the key 2, and in particular with the lower peripheral region 7*b* as shown in FIG. 3. According to a particular embodiment, the border 17*a* of the orifice 17 of the flexible membrane 14 cooperates with the bottom of a groove 8 arranged on the periphery of the key 2, which contributes in holding the key in position and guiding it during its displacement. According to a preferred embodiment, each key 2 is bearing, by its lower peripheral region 7*b*, on the border 17*a* of an orifice 17 of the flexible membrane 14. Thus, in the context of the invention, the surface of contact between the flexible membrane 14 and the key 2 is weak, because said contact takes place over the entire perimeter of the key 2, and contributes in holding the key in position over its entire displacement travel and guiding it.

Figure 4:
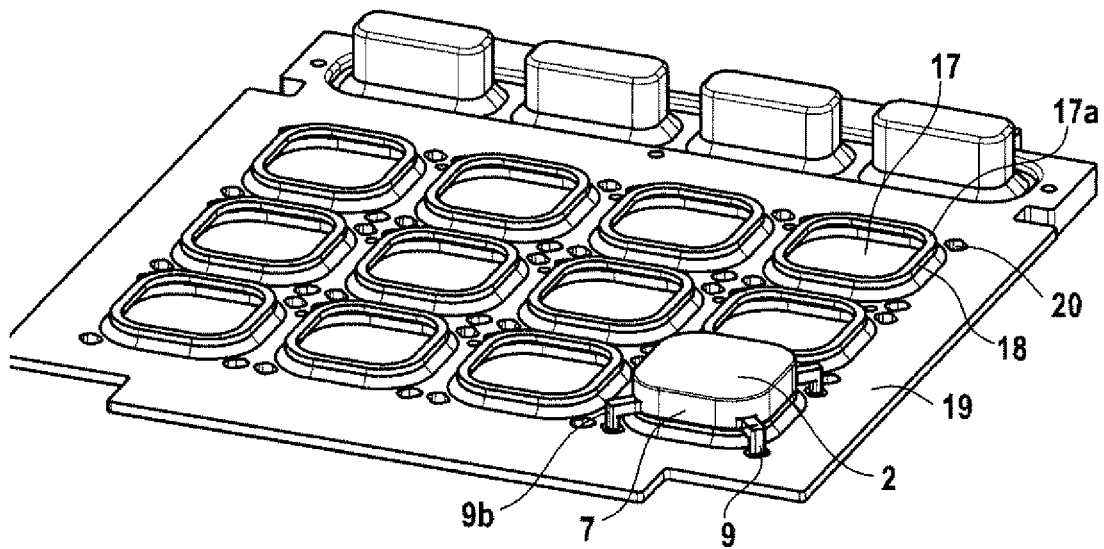
FIG. 4 is a perspective view of a flexible membrane in accordance with the invention, on which is placed a transparent key.
Figure 5:
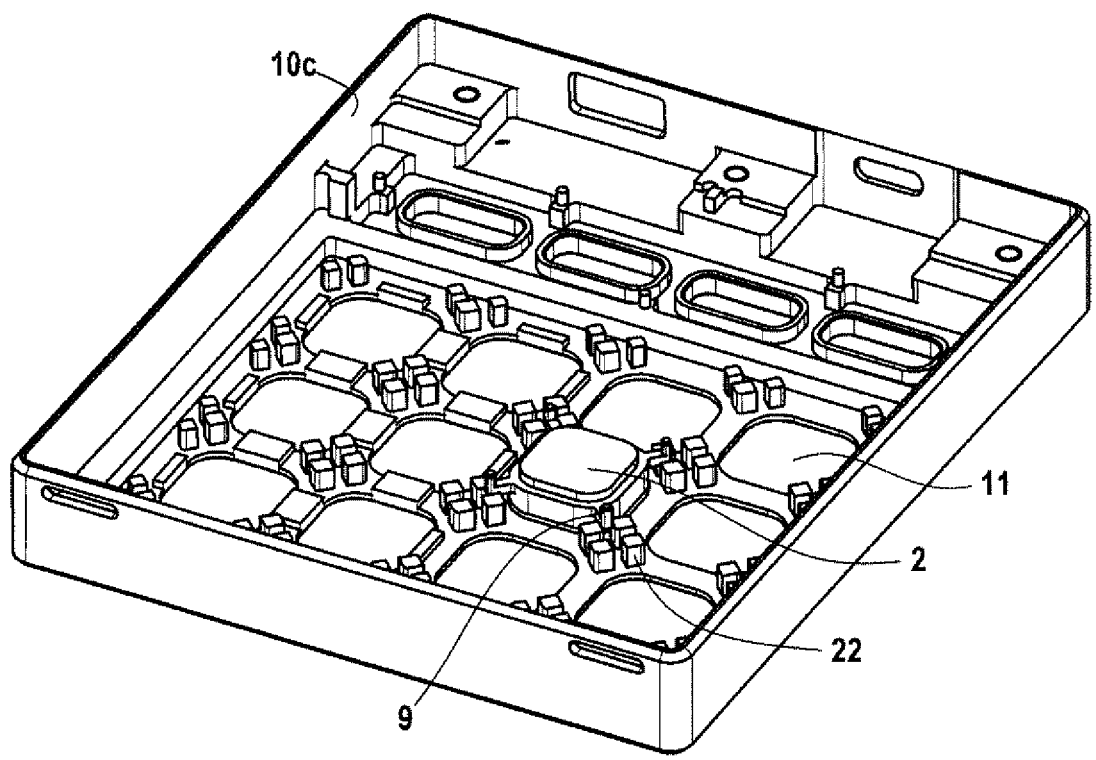
FIG. 5 is a perspective view of an inner face of a case including openings, with a key mounted in one of the openings of the case.
Figure 6A:
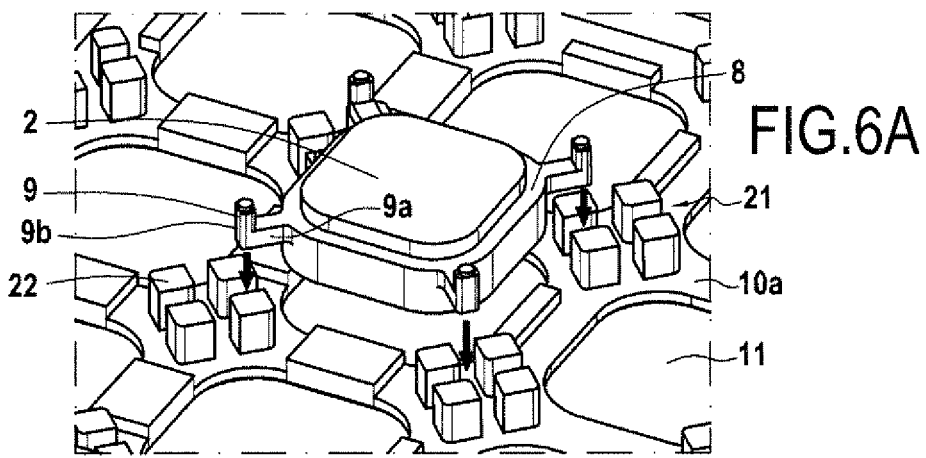
FIGS. 6A to 6C are perspective views showing the mounting of a transparent key in relation to its guide elements.
Figure 6B:
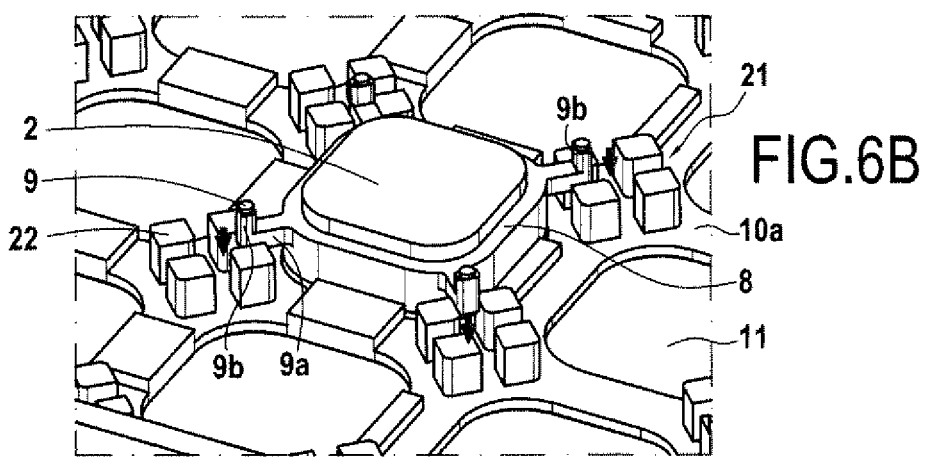
Figure 6C:
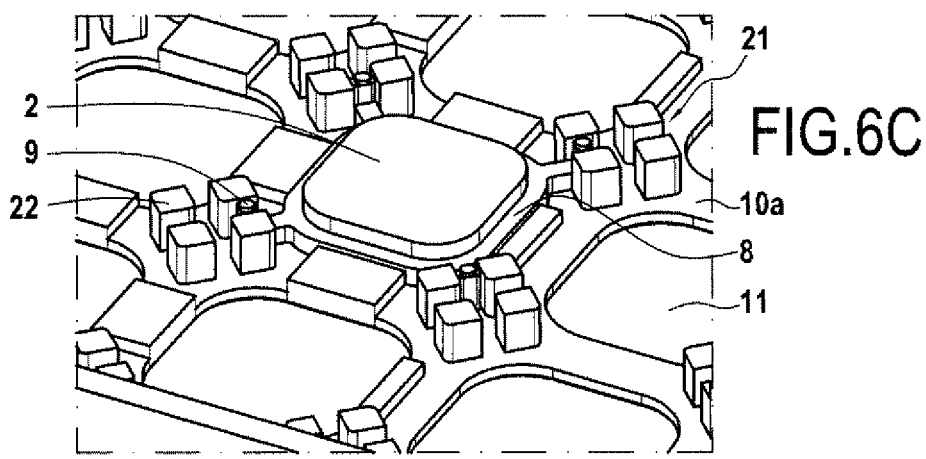

According to the embodiment shown in FIGS. 2 to 4, the flexible membrane 14 includes for each orifice 17, a skirt 18 rising from a base plate 19. Each skirt 18 then delimits at its free end the border 17a of the orifice 17 of the flexible membrane 14, and therefore the display path 5. In other words, the flexible membrane 14 can be of planar shape and provided with an orifice 17 for each key 2 with which it is in contact, the borders 17a of the orifices 17 being formed by the end of the skirt 18 capable of cooperating with the key 2, and particularly with its groove 8.

The skirt 18 is preferably of frusto-conical shape while rising in the direction of a superimposed key, with in the exemplary embodiment illustrated in the drawings, the large base located at the base plate 19 and the small base forming the border 17a of the orifice 17. According to this embodiment, this skirt 18 allows ensuring the desired actuating force and pressure feedback effect, and also allows good positioning of the key 2 relative to the opening 11 of the case 10. The geometry of the skirt 18 is in itself not limiting, and can be adapted by the person skilled in the art according to the desired technical characteristics.

Alternatively, according to another embodiment, the key 2 is linked by bonding to the flexible membrane 14 by its peripheral region 7.

Under the action of a pressure exerted on a key 2 with which it cooperates, the flexible membrane 14 deforms beyond a certain applied force (actuating force). Depending on the characteristics of the membrane, and in particular its geometry and hardness, the actuating force and the pressure feedback effect can be adjusted. This is routine work for the person skilled in the art, and will not be detailed here.

The flexible membrane 14 can be opaque, translucent, or even transparent. According to a particular embodiment, the membrane is opaque. According to another particular embodiment, the membrane is translucent, and preferably transparent.

Thus, the presence of this flexible membrane 14 is hardly or not visible through the transparent key 2, due to the small surface of contact between the key 2 and the flexible membrane 14. In addition, if the flexible membrane 14 is translucent or transparent, it is hardly or not visible also due to its translucent or transparent nature.

The flexible membrane 14 can be made of any polymeric material, such as silicone, rubber such as EPDM (ethylene-propylene-diene monomer) rubber, or polyurethane elastomers; or latex. According to a preferred embodiment, the flexible membrane 14 is made of silicone.

The hardness of the flexible membrane 14 and its geometry allow the actuating force and the pressure feedback force to be adjusted.

According to the embodiment shown in FIG. 4, the flexible membrane 14 further includes a passage hole 20 for each tab 9 of a key 2, and particularly for the actuating branch 9b. Thus, this passage hole 20 allows a tab 9 secured to a key 2 to pass through the flexible membrane 14, and thus to be in direct contact with the detection device 15 which provides the actuating signal when a pressure is exerted on said key. The presence of passage holes 20 allows the detection of a pressure exerted on the key 2.

According to one embodiment of the invention, the peripheral 1 further includes at least one structure 21 for guiding a key 2. Such a guide structure 21 allows having a stable and balanced displacement travel during a pressure exerted on the key 2.

In the context of the invention, the key 2 is guided in translation relative to the case 10 by its cooperation with the first face 10a of the case 10. Thus, when a pressure is exerted on the key, this guide structure allows a perpendicular displacement of the key relative to the case. In the example illustrated in the figures, the guide structure 21 is composed of a tab 9 secured to a key 2 and two guides 22 rising from the inner surface of the first face 10a of the case 10. According to this embodiment, the tab 9 allows both the detection of a pressure exerted on the key 2, but also the guiding of the key 2 in its movement.

The two guides 22 delimit therebetween a slide for the complementary tab 9, as shown in FIGS. 5 and 6A-6C. Thus, the tab 9, and particularly the actuating branch 9b, slides in the slide delimited by the two guides 22.

The height of the guides 22 must be large enough to allow the tab 9 to be guided throughout the displacement travel after a pressure exerted thereon. Indeed, a lower height does not allow good guidance of the key 2 throughout its travel. Preferably, the largest dimension D of the section of the guide 22 and the length L of the guide 22 are such that L>2.5 D. In the case where the guide 22 is of circular section, the largest dimension D corresponds to the section diameter.

In the mounted position of the peripheral, the guides 22 help holding the membrane 14 in position.

The guides 22 can be of different shapes, but are advantageously separate elements being in the form of lugs, pads or posts. Two guides 22 delimiting the same slide are advantageously of substantially identical shape and size. The guides 22, which extend protruding from the inner surface of the first face 10a of the case 10, are inserts or preferably form an integral part of the case 10.

Advantageously, the width of the slide delimited by two guides 22 is of dimension substantially equal, apart from the operating clearance, to the width of the actuating branch 9b, which allows avoiding the bracing of the actuating branch 9b. Preferably, the slide delimited by the guides 22 is adjusted to the actuating branch 9b so as to avoid the bracing of the actuating branch 9b and allow it to slide in the slide.

Advantageously, the guides 22 are made of a self-lubricated or almost self-lubricated plastic material, or of plastic material covered with varnish. Such plastic and varnish materials which may be suitable in the context of the invention are well known to the person skilled in the art and will not be detailed here. According to this embodiment, the coefficient of friction generated by the sliding of the actuating branch 9b in the slide is minimized.

In the context of the invention, the term "coefficient of friction" means the force resulting from the friction of the actuating branch 9b in movement relative to the guides 22.

The peripheral 1 may comprise at least one guide structure 21 per key 2, preferably at least three, and particularly four. Of course, the guide structure can be of any type known per se, and different from what is described above.

For the case where the peripheral 1 includes several guide structures 21, according to the embodiment shown in FIGS. 5, 6A, 6B and 6C, the guides 22 of two neighboring guide structures 21 are not interconnected. Alternatively, according to another embodiment which is not illustrated, the guides 22 of two neighboring guide structures 21 are interconnected.

According to the embodiment shown in FIGS. 5, 6A, 68 and 6C, two faces of a guide 22 together delimit a slide of two adjacent keys. In other words, a guide 22 can have two 90° faces which each delimit, with another neighboring guide 22, a slide for a separate tab 9.

According to a first embodiment illustrated in FIGS. 5, 6A, 6B and 6C, the peripheral comprises four guide structures 21 per key. According to this embodiment, the four guide structures 21 are aligned in pairs along two intersecting axes. Advantageously, the guide structures 21 of a key 2 aligned along the same axis are disposed on either side of the key 2.

For the case of a key 2 of trapezoidal section, and particularly of parallelogram, rectangular or square section, the four guide structures 21 are preferably aligned in pairs along the diagonals of the openings 11 of the first face 10a of the case 10. In this case, each guide structure 21 is placed at the corner of a key 2. The tab 9 then extends protruding from a corner of the key and the guides 22 are disposed on either side of each diagonal of the opening 11 of the first face 10a of the case 10.

Alternatively, the four guide structures 21 of a key 2 of trapezoidal section, and particularly of parallelogram, rectangular or square section, are disposed along one side of the key 2. In this case, the guide structures 21 are aligned in pairs along the perpendicular bisectors of the openings 11 of the first face 10a of the case 10. In this case, the tab 9 extends protruding from the peripheral region 7 of the key 2 and the guides 22 are disposed on either side of the perpendicular bisector of the sides of the key 2.

For the particular case of a square section key, as illustrated in FIGS. 5, 6A, 6B and 6C, the four guide structures 21 are advantageously aligned in pairs along two perpendicular axes, such as the perpendicular bisectors of the sides or, preferably, the diagonals.

In the case of a circular section key, the four guide structures 21 are advantageously aligned in pairs along two perpendicular axes.

According to a second embodiment, the peripheral comprises three guide structures 21 per key. According to this embodiment, the three guide structures 21 are distributed uniformly along the circle having the same center as the key 2, along axes intersecting at 120°.

According to the embodiment illustrated in FIGS. 5, 6A, 6B and 6C, the peripheral includes four guide structures per square section key 2: the tabs 9 extend protruding from the corners of each key 2 and, when a pressure is exerted on the key 2, the tabs 9 slide in a slide delimited by lugs 22 extending protruding from the inner surface of the first face 10a of the case 10 including the openings 11 for the keys 2. Each lug 22 includes two faces at 90° delimiting a slide of two adjacent keys.

The guide structure 21 according to the invention not only allows a stable and balanced displacement travel of the key 2 when a pressure is exerted thereon, but also leaves the display path 5 free.

The invention is not limited to the examples described and shown since various modifications can be made without departing from its scope.

The invention claimed is:

1. A peripheral (1) including at least one key (2) that is transparent, the at least one key actuable under the effect of pressure and engaged in an opening (11) arranged on a first face (10a) of a case (10), the at least one key (2) cooperating with the first face (10a) of the case (10), the peripheral (1) including a control and detection system (13) of a pressure exerted on the at least one key (2), and at least one screen (4) allowing symbols (3) to be displayed through the at least one key (2) via respectively a display path (5), characterized in that the control and detection system (13) includes a flexible membrane (14) ensuring an actuating force and a pressure feedback effect, said flexible membrane (14) including at least one orifice (17), the at least one orifice delimiting a display path (5) for the at least one key (2), and the at least one orifice (17) being delimited by a border (17a) cooperating with the at least one key (2).

2. The peripheral (1) according to claim 1, wherein the peripheral (1) comprises a series of keys (2).

3. The peripheral (1) according to claim 1, characterized in that the at least one key (2) includes a lower peripheral region (7b) bearing on the border (17a) of the at least one orifice (17) of the flexible membrane (14).

4. The peripheral (1) according to claim 1, characterized in that the flexible membrane (14) includes a skirt (18) extending from a base plate (19) and delimiting at a free end thereof the border (17a) of the at least one orifice (17) of the flexible membrane (14).

5. The peripheral (1) according to claim 1, characterized in that the border (17a) of the at least one orifice (17) of the flexible membrane (14) cooperates with the bottom of a groove (8) arranged around a periphery of the at least one key (2).

6. The peripheral (1) according to claim 1, characterized in that the control and detection system (13) includes a detection device (15) for detecting a pressure exerted on the at least one key (2) separate from the flexible membrane (14).

7. The peripheral (1) according to claim 6, characterized in that the detection device (15) has a bearing surface for the flexible membrane (14).

8. The peripheral (1) according to claim 6, characterized in that the detection device (15) includes one passage (16) per display path (5).

9. The peripheral (1) according to claim 6, characterized in that the detection device (15) includes a switching structure on which acts at least one tab (9) secured to the at least one key (2), so as to provide an actuating signal when a pressure is exerted on the at least one key (2).

10. The peripheral (1) according to claim 9, characterized in that the flexible membrane (14) includes a passage hole (20) for the at least one tab (9).

11. The peripheral (1) according to claim 1, characterized in that the flexible membrane of the control and detection system (13) incorporates a switching structure.

12. The peripheral (1) according to claim 1, wherein the at least one key (2) has at least one guide structure (21).

13. The peripheral (1) according to claim 12, characterized in that the guide structure (21) is composed of a tab (9) secured to the at least one key (2) and two guides (22) extending protruding from the inner surface of the first face (10a) of the case (10), to delimit therebetween a slide for said tab (9), at a height allowing to guide said tab (9) in the slide throughout displacement travel resulting from a pressure exerted on the at least one key (2).

14. The peripheral (1) according to claim 12, wherein the peripheral (1) includes four guide structures (21) for the at least one key (2).

15. The peripheral (1) according to claim 14, characterized in that the guide structures (21) of the at least one key are aligned in pairs along two intersecting axes.

16. The peripheral (1) according to claim 1, characterized in that the screen (4) is a bi-stable screen, preferably an electrophoretic screen.

17. The peripheral (1) according to claim 1, characterized in that the peripheral is an electronic control keyboard.

18. An article comprising a peripheral (1) according to claim 1.

* * * * *